(12) United States Patent
Nessi et al.

(10) Patent No.: US 7,545,612 B2
(45) Date of Patent: Jun. 9, 2009

(54) APPARATUS FOR POWERING ELECTRIC MOTORS

(75) Inventors: Maurizio Nessi, Como (IT); Ezio Galbiati, Agnadello (IT)

(73) Assignee: STMicroelectronics s.r.l., Agrate Brianza (MI) (IT)

( * ) Notice: Subject to any disclaimer, the term of this patent is extended or adjusted under 35 U.S.C. 154(b) by 175 days.

(21) Appl. No.: 11/109,975

(22) Filed: Apr. 20, 2005

(65) Prior Publication Data

US 2005/0248890 A1 Nov. 10, 2005

(30) Foreign Application Priority Data

Apr. 23, 2004 (EP) .................................. 04425282

(51) Int. Cl.
*H02H 5/04* (2006.01)
(52) U.S. Cl. ........................................................ 361/30
(58) Field of Classification Search ............. 361/23–31, 361/33, 54, 56–57, 79–84, 20–21, 86–87, 361/91.5–91.6; 318/376, 759
See application file for complete search history.

(56) References Cited

U.S. PATENT DOCUMENTS

| | | | | |
|---|---|---|---|---|
| 4,090,227 A | | 5/1978 | Schweitzer | |
| 5,410,441 A | * | 4/1995 | Allman | 361/18 |
| 5,513,058 A | * | 4/1996 | Hollenbeck | 361/36 |
| 5,781,390 A | * | 7/1998 | Notaro et al. | 361/84 |
| 5,825,597 A | * | 10/1998 | Young | 361/31 |
| 5,930,096 A | * | 7/1999 | Kim | 358/1.15 |
| 6,728,084 B2 | * | 4/2004 | Ziemer et al. | 361/33 |
| 7,005,820 B2 | * | 2/2006 | Tanner | 318/471 |
| 7,106,567 B2 | * | 9/2006 | Chloupek et al. | 361/91.1 |
| 2003/0206386 A1 | | 11/2003 | Hill et al. | |

* cited by examiner

*Primary Examiner*—Stephen W Jackson
*Assistant Examiner*—Terrence R Willoughby
(74) *Attorney, Agent, or Firm*—Lisa K. Jorgenson; Stephen Bongini; Fleit Gibbons Gutman Bongini & Bianco P.L.

(57) ABSTRACT

An apparatus is provided for powering at least one electric motor. The apparatus includes at least one driving device for driving the electric motor, a supply path positioned between a supply voltage generator and the at least one driving device, a first circuit, a control device, and a protection device for protecting against over-voltages. The first circuit is inserted in the supply path to enable and prevent the powering of the at least one driving device, and the control device controls at least the first circuit. The protection device includes a second circuit for detecting a current that flows in the supply path from the at least one driving device to the supply voltage generator, and a third circuit for selectively absorbing the current that is detected.

19 Claims, 5 Drawing Sheets

APPARATUS FOR POWERING ELECTRIC MOTORS

CROSS-REFERENCE TO RELATED APPLICATIONS

This application is based upon and claims priority from prior European Patent Application No. 04 425 282.3, filed Apr. 23, 2004, the entire disclosure of which is herein incorporated by reference.

FIELD OF THE INVENTION

The present invention relates to an apparatus for powering electric motors, and in particular to an apparatus for powering spindle motors and voice coil motors (VCMs).

BACKGROUND OF THE INVENTION

Conventional apparatuses for powering electric motors are known, for example, power combos or other powering devices used for hard disks in computers. A device for powering an electric motor basically comprises a device for driving the electric motor, and a control device suitable for regulating the supply voltage, which comes from a voltage generator outside the powering device, that is input to the driving device, and preferably suitable for controlling the electronic components belonging to the driving device. The regulation of the input supply voltage of the driving device is obtained by suitably controlling a device, preferably constituted by a MOSFET transistor and an intrinsic diode, that is inserted into the supply line that connects the voltage generator to the device for driving the electric motor.

A conventional power combo 1 is shown in FIG. 1. A supply voltage VCV coming from a voltage generator 2 is in input to the power combo 1. The power combo comprises a first driving device 3 for driving a spindle motor 4 that is outside the power combo 1, and a second driving device 5 for driving a voice coil motor 6, which is also outside the power combo 1. Still inside the power combo 1, a supply line 7 is provided between the voltage generator 2 and the driving devices 3 and 5. A MOSFET device 8 is inserted in this supply line 7, preferably an ISO-FET device comprising a MOS transistor M1 and an intrinsic diode D1. The driving devices 3 and 5 and the transistor M1 are controlled by a single control device 10 inside the power combo 1 and powered by the supply voltage VCV. A serial interface 20 having external input signals, such as clock and data signals, and being suitable for sending command signals to the control device 10, and a block 30 comprising further voltage regulators suitable for sending out regulated voltage signals are typically also provided inside the power combo 1.

During the operation of an electric motor, such as a voice coil or a spindle motor, operating conditions can occur such as to produce an increasing of the voltage between a circuit node VM, located downstream from the MOSFET device 8 and upstream from the driving devices 3 and 5, and ground. This is due to the current, which instead of flowing from the voltage generator 2 to the devices 3 and 5, flows in the opposite direction through the MOSFET device 8.

Such a situation is encountered, for example, when a voltage lower than the voltage of BEMF (Back Electromotive Force) generated by the motor itself is applied to the electric motor, in the case in which it is in rotation.

Another similar situation occurs when the driving devices 3 and 5, which are formed by MOS transistors, are driven in high impedance. The current that flows in the electric motor recirculates towards the voltage generator 2 through the intrinsic diodes of the MOS transistors of the driving devices 3 and 5.

In both of these situations, if the voltage generator 2 presents a component of high impedance towards ground it cannot absorb the current that flows from the driving devices 3 and 5 towards it. The current generates an over-voltage that can reach more or less high values according to the filter capacitances, that is the capacitance C1 connected between the supply voltage and ground and the capacitance C2 connected between the node VM and ground, which are used to filter the supply voltage VCV. The capacitances C1 and C2 are outside the circuit block in which the elements belonging to the apparatus 1 are integrated, that is the circuit elements 3, 5, 8, 10, 20 and 30. The over-voltage can reach high values such that it exceeds the voltage needed for the operating of the driving devices 3 and 5.

Methods for limiting the over-voltage are known that are based on the use of high value capacitance, for example increasing the value of the capacitances C1 and C2 by a few microfarads to 50 or 100 microfarads, or on the use of, also in combination with the high value capacitance, voltage suppressors, such as the Transil diode Dz of FIG. 1 positioned between the node VM and ground, that are suitable for limiting the supply voltage.

However, the known solutions are very expensive and bulky and are not in line with the current technological trends in the research of devices that are less and less bulky and not expensive.

SUMMARY OF THE INVENTION

In view of these drawbacks, it is an object of the present invention to provide an apparatus for powering electric motors that overcomes the above-mentioned drawbacks.

In accordance with one embodiment of the present invention, an apparatus for powering at least one electric motor is provided. The apparatus includes at least one driving device for the electric motor, a supply path, a first circuit, a control device, and a protection device for protection against over-voltages. The supply path is positioned between a supply voltage generator and the at least one driving device, and the first circuit is inserted in the supply path to enable and to prevent the powering of the at least one driving device. The control device is powered by the supply voltage and is suitable for controlling at least the first circuit. The protection device for protection against over-voltages includes a second circuit suitable for detecting a current that flows in the supply path from the at least one driving device to the supply voltage generator, and a third circuit suitable for selectively absorbing the current that is detected.

Accordingly, there is provided an apparatus for powering electric motors that is provided with a protection circuit for protecting against the over-voltages.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
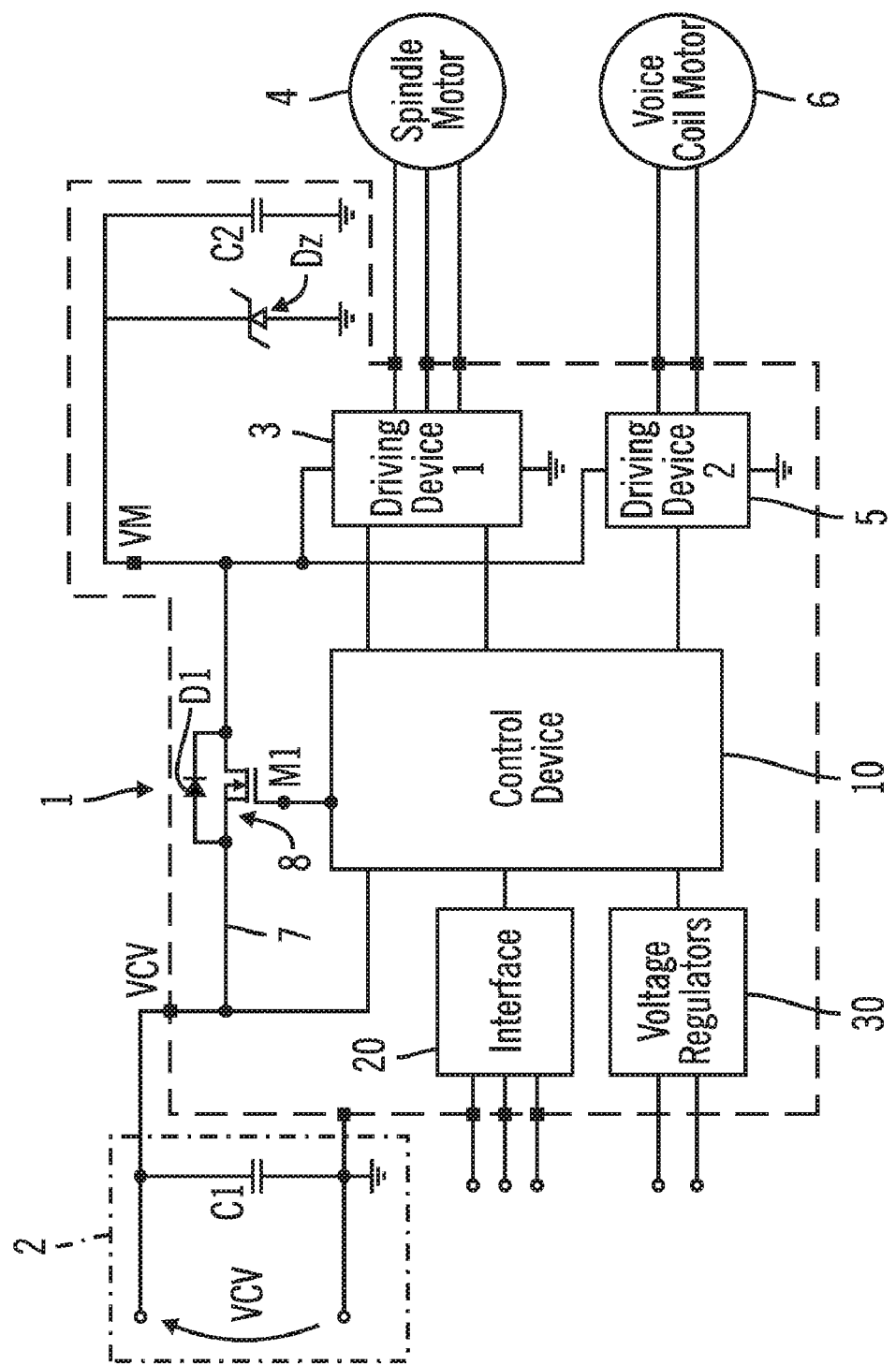
FIG. 1 is a block diagram of a conventional apparatus for powering electric motors.
Figure 2:
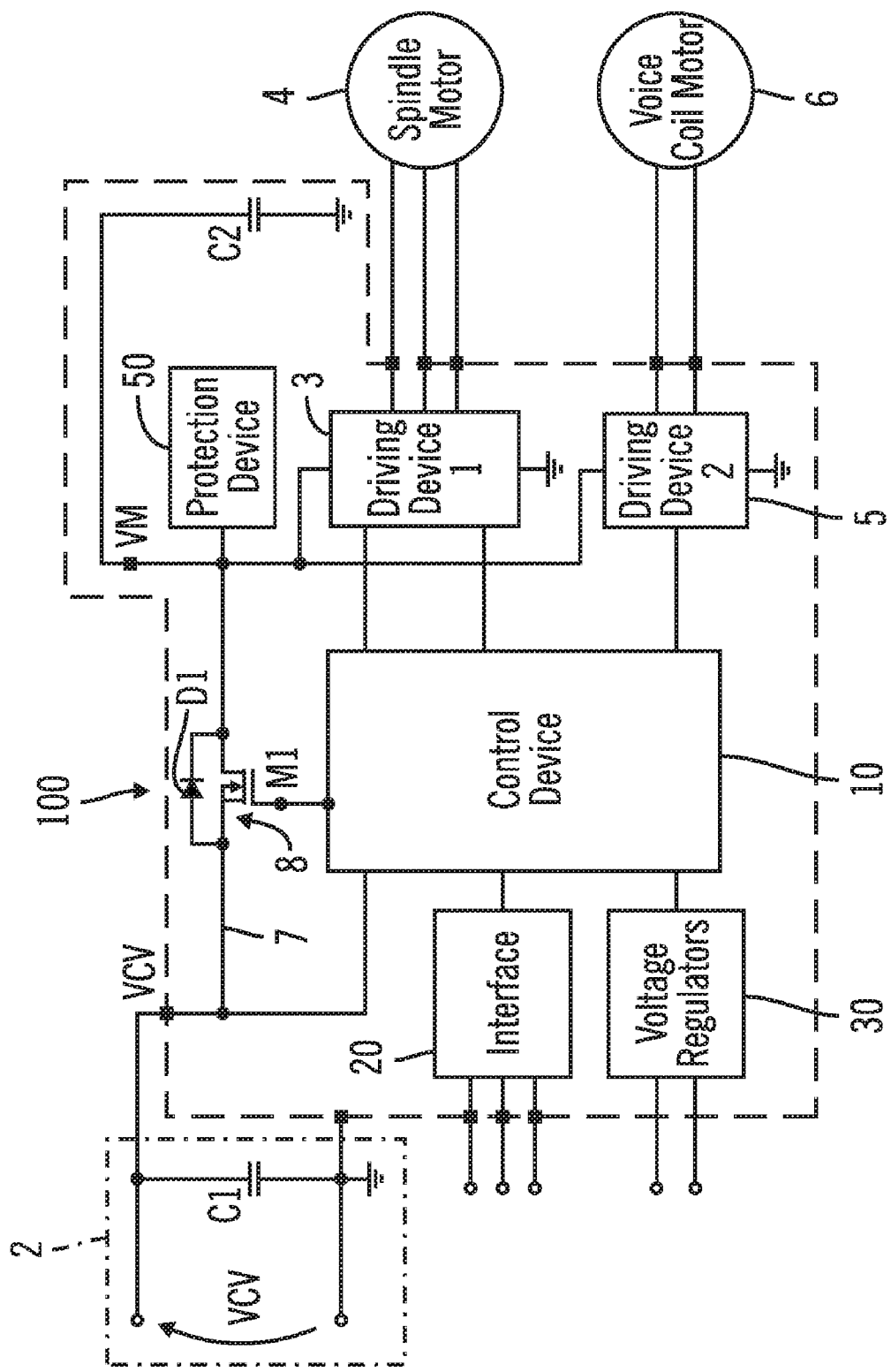
FIG. 2 is a block diagram of an apparatus for powering electric motors in accordance with a first embodiment of the present invention.

FIG. 2 shows an apparatus 100 for powering electric motors according to a first embodiment of the present invention. The elements that are the same as in the apparatus of FIG. 1 are indicated with the same numerical references. A supply voltage VCV coming from a voltage generator 2 is in input to the apparatus 100. The apparatus 100 comprises at least one driving device 3 and 5 for driving an electric motor, a supply line 7 between the voltage generator 2 and the driving device, a first device 8, and a control device 10. The first device 8 is inserted in the supply line 7 and is suitable for preventing or enabling the powering of the driving device. The control device 10 is suitable for controlling at least the first device 8 and is powered by the supply voltage VCV. Preferably, the control device 10 is also suitable for controlling the circuit elements belonging to the at least one driving device 3 and 5.

Preferably, the apparatus 100 is a power combo suitable for powering two electric motors, such as a spindle motor 4 and a voice coil motor 6, through two different driving devices, a first driving device 3 for driving the spindle motor 4 and a second driving device 5 for driving the voice coil motor 6. Preferably, the first device 8 is a MOSFET device, and even more preferably it is an ISO-FET device comprising a MOS transistor M1 and an intrinsic diode D1. The driving devices 3 and and the transistor M1 are controlled by the control device 10 inside the power combo 100.

Still inside the apparatus 100, a protection device 50 is present that is suitable for the protection of the whole apparatus against the over-voltages; the protection device 50 is connected to a circuit node VM of the supply line 7 that is downstream from the first device 8 and upstream from the driving devices 3 and 5. The protection device 50 comprises a first circuit suitable for detecting the current flow inversion, that is when the current is directed towards the supply voltage generator 2, and a second circuit suitable for absorbing the current flow.

Figure 3:
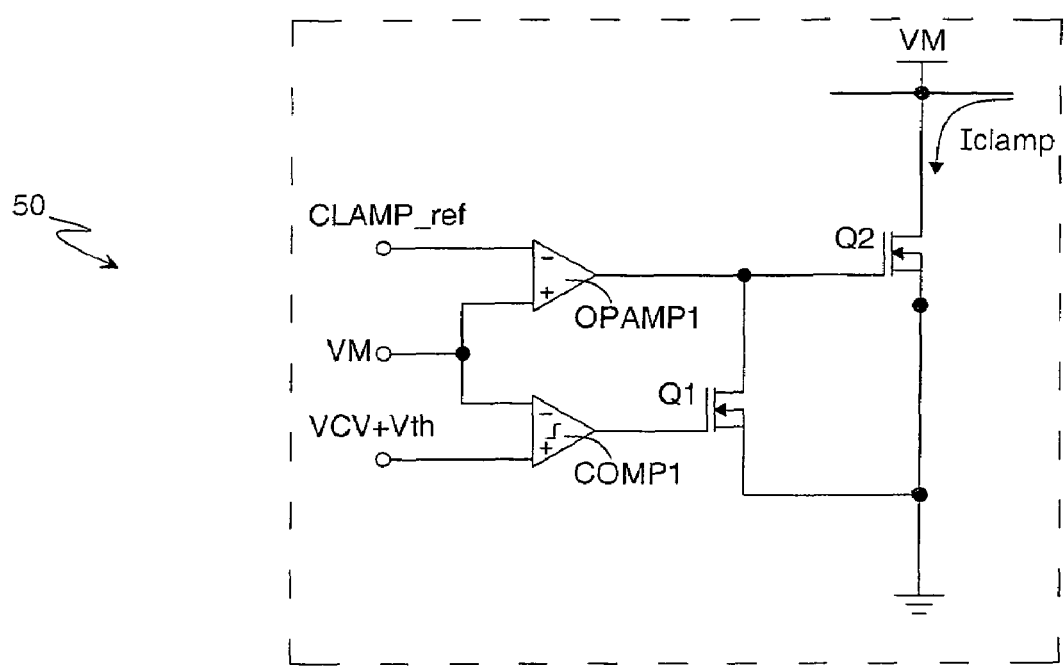
FIG. 3 is a circuit diagram of a preferred embodiment of the protection device for protecting against the over-voltages of the apparatus of FIG. 2.

FIG. 3 shows a preferred embodiment of the protection device 50 of FIG. 2. The second circuit is made up of a MOS transistor Q2 that has its non-drivable terminals connected respectively to the node VM and to ground and that is driven by the first circuit, which comprises an operational amplifier OPAMP1 whose output is connected with the drivable terminal of the transistor Q2. The transistor Q2 is preferably an NMOS transistor having its source terminal connected to ground and its drain terminal connected to the node VM. The amplifier OPAMP1 has its non-inverting input terminal connected to the node VM while on its inverting terminal there is a voltage CLAMP_ref that represents the voltage value at which the protection is required to be carried out. In fact, if the voltage on the node VM is greater than the voltage CLAMP_ref, the transistor Q2 is turned on and there is the passage of the current Iclamp, that is the current coming from the motors 4 and 6, through the driving devices 3 and 5, from the node VM to ground. The value of voltage CLAMP_ref is greater than the supply voltage VCV; for example in one embodiment VCV=13.2V and is fixed, and CLAMP_ref=14.5V.

The first circuit also comprises a hysteresis comparator COMP1 that has its input terminals connected to the ends of the first device 8, that is connected with the non-drivable terminals of the transistor M1 and with the terminals of the intrinsic diode D1. Therefore the inverting terminal is connected to the node VM while on the non-inverting terminal there is a voltage given by VCV+Vth, where the voltage Vth represents the intervention threshold of the comparator COMP1 with reference to the voltage VCV. The value of the voltage Vth is given by the firing resistance in saturation Rdson (normally some tens of milliohms) of the transistor M1 for the current that flows in it; that is the value Vth indicates the value of the current that flows in the transistor M1 at the moment the device 50 intervenes. For example in one embodiment with Rdson=50 mΩ, there can be Vth=10 mV with a current of 200 mA. The output terminal of the comparator COMP1 is connected to the drivable terminal of another MOS transistor Q1, which has one non-drivable terminal connected to the drivable terminal of the transistor Q2 and the other non-drivable terminal connected to ground. Preferably the transistor Q1 is an NMOS transistor having the source terminal connected to ground and the drain terminal connected to the gate terminal of the transistor Q2. The transistor Q1 is normally on in order to keep the transistor Q2 off, but is turned off by the comparator COMP1 when the voltage on the node VM exceeds the voltage VCV+Vth (for example, VCV+10 mV).

In this case the difference that the comparator COMP1 should see is given by the value of the resistance Rdson for the current that flows in the MOS transistor M1 towards the supply voltage generator 2. The current generated by the motor cannot pass entirely through the first device 8 but a part of it can flow towards ground through other paths, for example through the capacitance C2, of low value, that is positioned between the node VM and ground.

Figure 4:
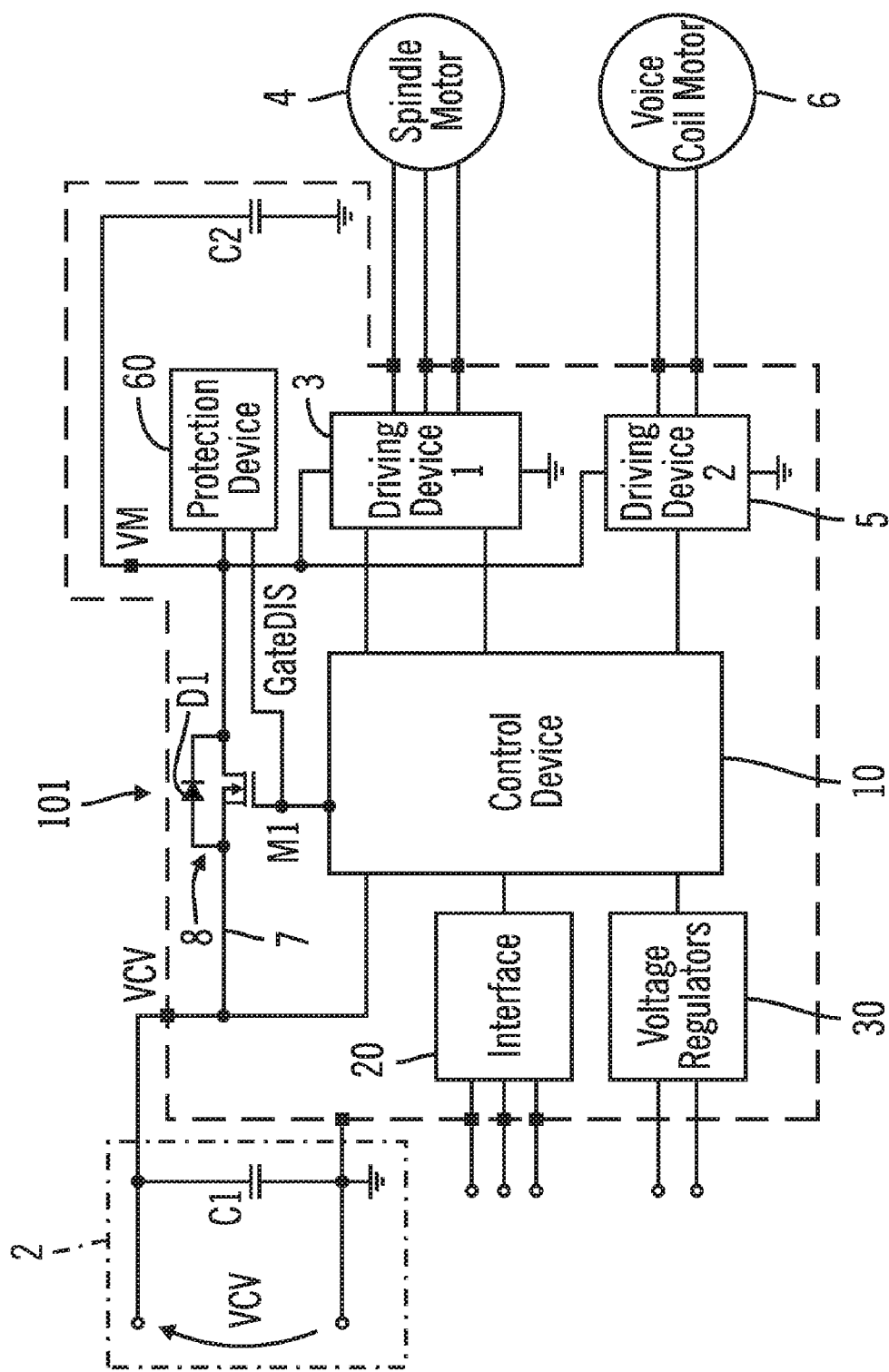
FIG. 4 is a block diagram of an apparatus for powering electric motors in accordance with a second embodiment of the present invention.

FIG. 4 shows an apparatus 101 for powering electric motors in accordance with a second embodiment of the present invention. The same elements in common with the first embodiment are indicated with the same numerical references. The apparatus 101 differs from the apparatus 100 of FIG. 2 in the presence of a different protection device 60 for the protection against the over-voltages that has an output GateDis suitable for driving the first device 8. The protection device 60, in turn, differs from the protection device 50 of FIG. 2, in the presence of a further circuit suitable for turning off the first device 8. In this manner, between the supply voltage VCV and the circuit node VM there is only the intrinsic diode D1 which, in the case in which current flows from the electric motor, that is from the motors 4 and 6, blocks the passage of the current towards the supply voltage generator 2 while the value of the voltage between the node VM and ground rises and the current can circulate only through the capacitance C2.

Figures 5, 6:
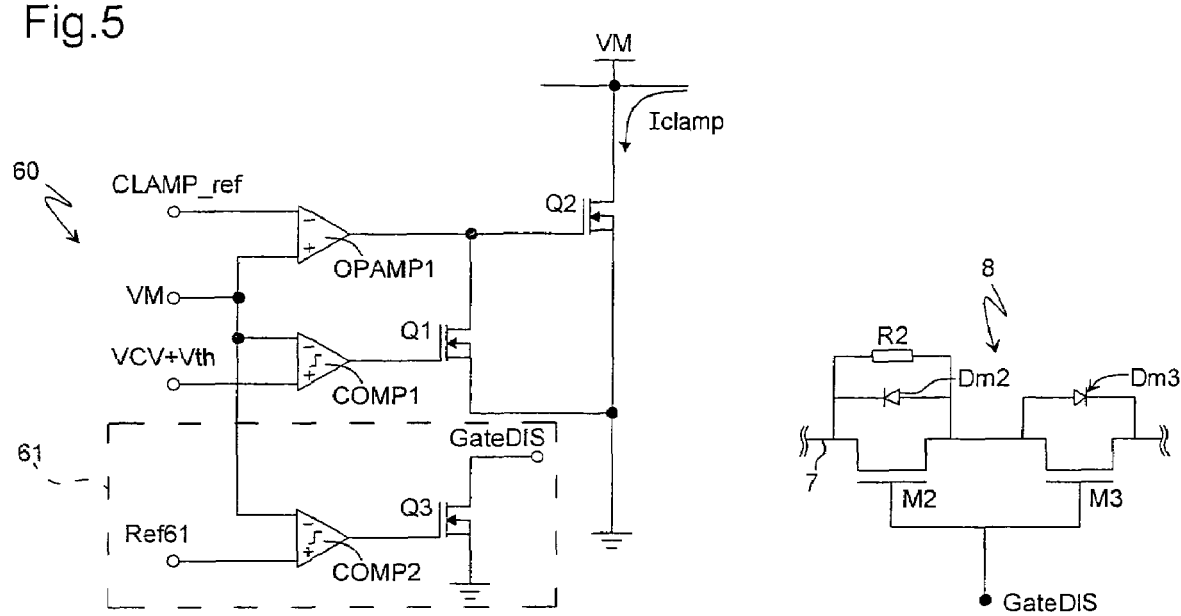
FIG. 5 is a circuit diagram of a preferred embodiment of the protection device for protecting against the over-voltages of the apparatus of FIG. 4.
FIG. 6 shows another embodiment of the device for enabling and preventing powering of the driving device.

FIG. 5 shows a preferred embodiment of the protection device 60 of FIG. 4. The further circuit 61 for turning off the first device 8 comprises a further comparator COMP2 with hysteresis suitable for comparing the voltage on the node VM with a voltage Ref61 that has an intermediate value between the value of the supply voltage VCV and the voltage CLAMP_ref. More precisely the voltage Ref61 is supplied to the non-inverting terminal of the further comparator COMP2 while the voltage VM is supplied to the inverting terminal. When the voltage VM exceeds the voltage Ref61 the further comparator COMP2 sends an output signal suitable for turning on a transistor Q3 whose non-drivable terminals are connected respectively to the drivable terminal of the first device 8 and to ground. Preferably the transistor Q3 is an NMOS transistor having its source terminal connected to ground and its drain terminal connected to the drivable terminal of the transistor M1. The transistor Q3, once activated, turns off the transistor M1 by bringing the signal GateDis to a voltage value that is substantially equal to ground. The rest of the circuitry of the protection device 60 is identical to the circuitry of the protection device 50 of FIG. 3 and has the same operation.

The first device 8 used in the above-mentioned embodiments of the present invention can comprise only one transistor M1 with its own intrinsic diode, or more than one transistor with a relative intrinsic diode, as shown in FIG. 6. In the embodiment of FIG. 6, the first device 8 comprises two transistors M2 and M3 with respective intrinsic diodes Dm2 and Dm3. In this case a resistance R2 of low value can be inserted, for example 5Ω, at the ends of the diode Dm2 to limit the value of the current above all at the initial moment of powering the apparatus.

The apparatus 101 of FIG. 4 is particularly suited for use in applications in which the first device 8 and the driving device 3 are not integrated in the same chip as the other elements of the apparatus 101, for example in the case of problems due to high dissipation of power. For the devices 3 and 8 discrete elements are used, for example MOS transistors that have lower firing resistance Rdson characteristics than MOS transistors of the integrated type, that is between 50 and 60 milliohms. The detection of the inversion of the current actuated by the comparator COMP1 becomes critical given that the voltage at the ends of the firing resistance Rdson is lower (on the order of 5 mV) and is similar to the offset voltage of the comparator.

With the apparatus 101 of FIG. 4, the value of the capacitances C1 and C2 has no importance given that with the turning off of transistor M1 there is no passage of current towards the supply voltage generator 2.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. An apparatus for powering at least one electric motor, said apparatus comprising:
    at least one driving device for driving the electric motor;
    a supply path positioned between a supply voltage generator and the at least one driving device;
    a first circuit inserted in the supply path to enable and prevent the powering of the at least one driving device;
    a control device powered by a supply voltage, the control device controlling at least the first circuit; and
    a protection device for protecting against over-voltages, the protection device including:
        a first protection circuit for detecting when a current flows in the supply path from the at least one driving device to the supply voltage generator; and
        a second protection circuit for selectively absorbing the current,
    wherein the second protection circuit includes a transistor having one non-drivable terminal connected to ground and another non-drivable terminal connected to a circuit node of the supply path that is located downstream from the first circuit and upstream from the at least one driving device.

2. The apparatus according to claim 1, wherein the first protection circuit includes a circuit element for comparing a voltage between the circuit node and ground with a first threshold voltage, the circuit element activating the transistor when the voltage between the circuit node and ground exceeds the first threshold voltage so as to provide a path between the circuit node and ground, the first threshold voltage being greater than the supply voltage.

3. The apparatus according to claim 2, wherein the first protection circuit detects that the current flows in the supply path from the at least one driving device to the supply voltage generator when the voltage between the circuit node and ground exceeds a second threshold voltage, which is lower than the first threshold voltage but greater than the supply voltage.

4. The apparatus according to claim 3, wherein the first protection circuit includes:
    a comparator for comparing the voltage between the circuit node and ground with the second threshold voltage; and
    a further circuit element for enabling activation of the transistor when the voltage between the circuit node and ground exceeds the second threshold voltage.

5. The apparatus according to claim 4, wherein the protection device further includes a third protection circuit for deactivating the first circuit when the voltage between the circuit node and ground is greater than a third threshold voltage, the third threshold voltage being greater than the supply voltage.

6. The apparatus according to claim 5, wherein the third threshold voltage is lower than the first threshold voltage.

7. The apparatus according to claim 5, wherein the third protection circuit includes:
    a further comparator for comparing the voltage between the circuit node and ground with the third threshold voltage; and
    a further transistor controlled by an output signal from the further comparator, the further transistor deactivating the first circuit when the voltage between the circuit node and ground is greater than the third threshold voltage.

8. The apparatus according to claim 1, wherein the at least one driving device includes a first driving device for driving a spindle motor and a second driving device for driving a voice coil motor.

9. The apparatus according to claim 1, wherein the first circuit includes at least two transistors connected in series between the supply voltage generator and the at least one driving device.

10. The apparatus according to claim 1, wherein the protection device is connected to a circuit node of the supply path that is located downstream from the first circuit and upstream from the at least one driving device.

11. The apparatus according to claim 1, wherein the second protection circuit is connected to a circuit node of the supply path that is located downstream from the first circuit and upstream from the at least one driving device.

12. An apparatus for powering at least one electric motor, said apparatus comprising:
   at least one driving device for driving the electric motor;
   a supply path positioned between a supply voltage generator and the at least one driving device;
   a first circuit inserted in the supply path to enable and prevent the powering of the at least one driving device;
   a control device powered by a supply voltage, the control device controlling at least the first circuit; and
   a protection device for protecting against over-voltages, the protection device including:
      a first protection circuit for detecting when a current flows in the supply path from the at least one driving device to the supply voltage generator; and
      a second protection circuit for selectively absorbing the current,
   wherein the protection device further includes a third protection circuit for deactivating the first circuit when the voltage between a circuit node of the supply path, which is located downstream from the first circuit and upstream from the at least one driving device, and ground is greater than a third threshold voltage, the third threshold voltage being greater than the supply voltage.

13. The apparatus according to claim 12, wherein the third protection circuit includes:
   a comparator for comparing the voltage between the circuit node and ground with the third threshold voltage; and
   a transistor controlled by an output signal from the comparator, the transistor deactivating the first circuit when the voltage between the circuit node and ground is greater than the third threshold voltage.

14. An apparatus for powering at least one electric motor, said apparatus comprising:
   at least one driving device for driving the electric motor;
   a supply path positioned between a supply voltaae generator and the at least one driving device;
   a first circuit inserted in the supply path to enable and prevent the powering of the at least one driving device;
   a control device powered by a supply voltage, the control device controlling at least the first circuit; and
   a protection device for protecting all of the apparatus against over-voltages, the protection device including:
      a first protection circuit for detecting when a current flows in the supply path from the at least one driving device to the supply voltage generator; and
      a second protection circuit for selectively absorbing the current, the second protection circuit being external to the at least one driving device,
   wherein the first circuit includes a MOS transistor and an intrinsic diode whose terminals are coupled to non-drivable terminals of the MOS transistor.

15. An apparatus, comprising:
   at least one electric motor;
   at least one driving device for driving the electric motor;
   a supply voltage generator supplying a supply voltage;
   a supply oath positioned between the supply voltage generator and the at least one driving device;
   a first circuit inserted in the supply path to enable and prevent the powering of the at least one driving device;
   a control device powered by the supply voltage, the control device controlling at least the first circuit; and
   a protection device for protecting all of the apparatus against over-voltages, the protection device including:
      a first protection circuit for detecting when a current flows in the supply path from the at least one driving device to the supply voltage generator; and
      a second protection circuit for selectively absorbing the current, the second protection circuit being external to the at least one driving device,
   wherein the second protection circuit includes a transistor having one non-drivable terminal connected to ground and another non-drivable terminal connected to a circuit node of the supply path that is located downstream from the first circuit and upstream from the at least one driving device.

16. The apparatus according to claim 15, wherein the first protection circuit includes a circuit element for comparing a voltage between the circuit node and ground with a first threshold voltage, the circuit element activating the transistor when the voltage between the circuit node and ground exceeds the first threshold voltage so as to provide a path between the circuit node and ground, the first threshold voltage being greater than the supply voltage.

17. The apparatus according to claim 16, wherein the first protection circuit includes:
   a comparator for comparing the voltage between the circuit node and ground with the second threshold voltage; and
   a further circuit element for enabling activation of the transistor when the voltage between the circuit node and ground exceeds the second threshold voltage.

18. The apparatus according to claim 15,
   wherein the at least one electric motor includes a spindle motor and a voice coil motor; and
   the at least one driving device includes a first driving device for driving the spindle motor and a second driving device for driving the voice coil motor.

19. The apparatus according to claim 15, wherein the first circuit includes at least two transistors connected in series between the supply voltage generator and the at least one driving device.

* * * * *